US009421907B2

(12) United States Patent
Carpani et al.

(10) Patent No.: US 9,421,907 B2
(45) Date of Patent: Aug. 23, 2016

(54) VEHICLE LEVEL INDICATOR DEVICE

(71) Applicant: Level Systems Pty Ltd, Kenthurst (AU)

(72) Inventors: Anthony Carpani, Kenthurst (AU); Gary Gleeson, Mona Vale (AU)

(73) Assignee: Level Systems Pty Ltd, Kenthurst, New South Wales (AU)

( * ) Notice: Subject to any disclaimer, the term of this patent is extended or adjusted under 35 U.S.C. 154(b) by 0 days.

(21) Appl. No.: 14/386,975

(22) PCT Filed: Mar. 21, 2013

(86) PCT No.: PCT/AU2013/000283
§ 371 (c)(1),
(2) Date: Sep. 22, 2014

(87) PCT Pub. No.: WO2013/138858
PCT Pub. Date: Sep. 26, 2013

(65) Prior Publication Data
US 2015/0048936 A1     Feb. 19, 2015

(30) Foreign Application Priority Data
Mar. 22, 2012    (AU) .................................. 2012901132

(51) Int. Cl.
*B60Q 1/00*     (2006.01)
*B60Q 3/04*     (2006.01)
(Continued)

(52) U.S. Cl.
CPC .. *B60Q 3/04* (2013.01); *G01C 9/00* (2013.01); *G01C 9/04* (2013.01)

(58) Field of Classification Search
CPC ..................................... G01C 9/00; G01C 9/04
USPC ................. 340/440, 438, 679, 689, 3.7, 5.33; 701/36, 37, 38, 39; 180/282; 280/6.153
See application file for complete search history.

(56) References Cited

U.S. PATENT DOCUMENTS 3,657,695 A    4/1972    Birmingham ................. 340/431
4,547,972 A    10/1985   Heidel et al.
(Continued)

FOREIGN PATENT DOCUMENTS

DE    20300047    3/2003
EP    0297736     8/1992
(Continued)

OTHER PUBLICATIONS

Wulf et al., Applicant's Remarks submitted with Demand in International Application No. PCT/AU2013/000283, mailed Jan. 22, 2014, 3 pages.
(Continued)

*Primary Examiner* — Toan N Pham
(74) *Attorney, Agent, or Firm* — Sunstein Kann Murphy & Timbers LLP (57) ABSTRACT

A level indicator device is disclosed for use in conjunction with a road vehicle such as a caravan, trailer, motor home or mobile crane and which comprises an electrically energized level sensor that is arranged to provide an output signal that is representative of a prevailing level of the sensor, a signal generator associated with the sensor and arranged in use to generate a signal that is representative of a substantially horizontal level when that level is sensed to prevail by the sensor. A radiofrequency signal transmitter is located in circuit with the signal generator and is arranged to transmit a radiofrequency signal that is modulated by the signal generated by the signal generator, and a remote receiver is provide and is arranged to receive and demodulate the radiofrequency signal. In one embodiment of the level indicator device the level sensor comprises a MEMS accelerometer that measures G-force in plural axes. Also disclosed is a vehicle level adjusting system for a road vehicle and which comprises a level indicator device as defined and a plurality of level adjusting devices, in the form of ramps or jacking actuators, that are arranged to effect levelling of the vehicle.

13 Claims, 7 Drawing Sheets

(51) Int. Cl.
*G01C 9/00* (2006.01)
*G01C 9/04* (2006.01)

(56) References Cited

U.S. PATENT DOCUMENTS

| | | | | |
|---|---|---|---|---|
| 4,760,649 | A * | 8/1988 | Preston | G01C 9/12 33/333 |
| 6,037,874 | A | 3/2000 | Heironimus | |
| 6,397,133 | B1 * | 5/2002 | van der Pol | B60R 16/0233 180/282 |
| 7,025,361 | B1 * | 4/2006 | Erickson | B60S 9/02 280/6.153 |
| 7,743,520 | B1 | 6/2010 | Jiorle | 33/366.11 |
| 7,786,883 | B1 * | 8/2010 | Davison, III | B60P 3/36 33/366.11 |
| 8,083,015 | B2 | 12/2011 | Kobayashi | 180/65.21 |
| 2007/0180719 | A1 * | 8/2007 | Donnelly | G01C 9/06 33/366.11 |
| 2008/0142768 | A1 * | 6/2008 | Thorpe | B60S 9/12 254/423 |

FOREIGN PATENT DOCUMENTS

| | | | |
|---|---|---|---|
| GB | 2387006 | 10/2003 | ............... B62J 27/00 |
| WO | WO 8201183 | 4/1982 | |

OTHER PUBLICATIONS

Australian Patent Office, International Preliminary Report on Patentability in International Application No. PCT/AU2013/000283, mailed Mar. 6, 2014, 4 pages.

Australian Patent Office, Examination Report in Australian Application 20013202361, mailed Nov. 15, 2013, 4 pages.

Anonymous, "Seculine Action Level Cross. 7-11 Digital level Meter: Amazon.co.uk: Camera & Photo," Dec. 28, 2009, XP055222942, Retrieved from the Internet: URL:http://www.amazon.co.uk/Seculine-Action-Level-Cross-Digital/dp/B00327G192 [retrieved on Oct. 22, 2015]; 5 pages.

Seculine, "AL205—Instructions," A Action Level Cross—Model 7-11; Jan. 1, 2010, XP055222965, Retrieved from the Internet: URL:http://secu-1 ine.com. [retrieved on Oct. 22, 2015]; 1 page.

Extended European Search Report, European Patent Application 13763522.3, dated Nov. 5, 2015; 10 pages.

* cited by examiner

Fig_6

Fig_7

VEHICLE LEVEL INDICATOR DEVICE

TECHNICAL FIELD

A level indicator device is disclosed for use in conjunction with a road vehicle and, in one possible embodiment, a vehicle level adjusting system is disclosed which incorporates the level indicator device.

BACKGROUND ART

Various types of road vehicles are required, during positioning, to be levelled (i.e. disposed substantially horizontally) in at least one direction (typically in the lateral, "east-west" direction) and, in many cases, in two orthogonal, east-west and longitudinal ("north-south") directions. Such road vehicles can include:

a) mobile cranes which must be levelled, normally using on-board hydraulic jacks, before being operated in a load lifting mode, b) various product-transport trucks, c) caravans (sometimes known as trailers), and d) so-called motor homes.

The present disclosure will, for convenience, hereinafter largely pertain to the context of caravans but it is to be understood that the form and operation of the subject level indicator device and vehicle level adjusting system may be adapted to other relevant types of road vehicles, such as those set forth above.

In the case of caravans, levelling may be required for any one or more of a number of reasons, for example to facilitate efficient functioning of on-board refrigerator units (particularly those employing an absorption system), to provide for waste water drainage and for occupant comfort. Such levelling is almost always required in caravan parks, where uneven ground can be common, and even more so in off-site locations.

When positioning a caravan, for example, in a selected site, levelling currently is achieved by first assessing the degree and direction of localised east-west inclination of the site. This may be achieved by visual inspection of the site, using a trained eye, or, more usually, by placing a spirit level on or in the caravan. This is then followed by placing a ramp behind the wheel or each of the wheels in the case of a twin-axle caravan at the lower side of the caravan and by then reversing the caravan up the ramp(s) to the extent required to achieve a substantially horizontal disposition. Several attempts frequently are required to be made, even by experienced users of caravans, to achieve an acceptable degree of levelling (determined by reference to the spirit level) when employing this customary procedure, and it is recognised that this is one of the more stressful aspects of caravanning.

Following the east-west levelling, a measure is taken of the caravan inclination in the north-south direction, again customarily by use of a spirit level, and north-south levelling is effected by adjustment of the caravan jockey wheel, upwardly or downwardly as required.

References to the background art herein do not constitute an admission that the art forms a part of the common general knowledge of a person of ordinary skill in the art, in Australia or elsewhere.

SUMMARY OF THE DISCLOSURE

Broadly defined, the level indicator device as disclosed herein comprises an electrically energised level sensor that is arranged to provide an output signal that is representative of a prevailing level of the sensor, a signal generator associated with the sensor and arranged in use to generate a signal that is representative of a substantially horizontal level when that level is sensed to prevail by the sensor, a radiofrequency signal transmitter located in circuit with the signal generator and arranged to transmit a radiofrequency signal that is modulated by the signal generated by the signal generator, and a remote receiver that is arranged to receive and demodulate the radiofrequency signal.

The level indicator device may facilitate more convenient levelling of a road vehicle (of any type) when the device is used in conjunction with the vehicle.

In use, the level sensor and associated signal generator can be mounted to the road vehicle. The remote receiver may comprise either a hand-held device or a fixed position device and, in the latter case, be located within a towing vehicle or in a drive cabin of a unitary vehicle.

The electrically energised level sensor may be constituted by any sensor device that is suitable for providing an output (to the signal generator) that is indicative of the prevailing level of the level sensor and, thus, the prevailing level of a road vehicle to which the level sensor can in use be mounted. The level sensor in one possible form may comprise a micro-controlled electro-mechanical (MEMS) based tilt sensor, for example a MEMS accelerometer that measures G-force in plural axes.

The signal generator may be arranged to generate a signal that is representative of the required sensed level (i.e. the "substantially horizontal" level) and, additionally, signals that are representative of levels that are inclined (positively and negatively) to the horizontal. By "substantially horizontal" is meant ($0°+/-5°$) and desirably ($0°+/-<0.5°$), although this may vary in dependence upon the application of the level indicator device.

The remote receiver may comprise an electrically energised device that provides a visual, audible or audio-visual output upon receipt of a signal that is representative of the required level sensed by the level sensor. The remote receiver in one simple form may comprise a buzzer device for providing a clearly audible signal to a person who is seeking to park the vehicle in a level position, e.g. with a horizontal disposition in the east-west direction.

Also disclosed herein is a vehicle level adjusting system that comprises a level indicator device as defined above and a plurality of level adjusting devices that are arranged to effect levelling of the vehicle in the east-west direction. The level adjusting devices may comprise:

a) ramps, up which the vehicle may be manoeuvred to adjust the vehicle level to a horizontal disposition, or b) jacking actuators which are positioned and actuatable for the same purpose.

These actuators may comprise mechanical, hydraulic or pneumatic jacks.

The level adjusting (jacking) devices may be operated/actuated independently of the level indicator device or, in one embodiment of the system, may be coupled to the level sensor (for example, by way of a servo-system) for the purpose of effecting automatic levelling of the vehicle.

As in the case of the prior art vehicle levelling procedure, the vehicle (when in the form of a caravan) may be levelled in the north-south direction by use of the conventional jockey wheel or, in any case, by employment of the above mentioned jacking actuators.

The level indicator device and vehicle level adjusting system will be more fully understood from the following description of illustrative embodiments of a level indicator device and system that are suitable for use in relation to a recreational road vehicle in the form of a caravan. The description is provided with reference to the accompanying drawings.

DETAILED DESCRIPTION OF SPECIFIC EMBODIMENTS

Figure 1:
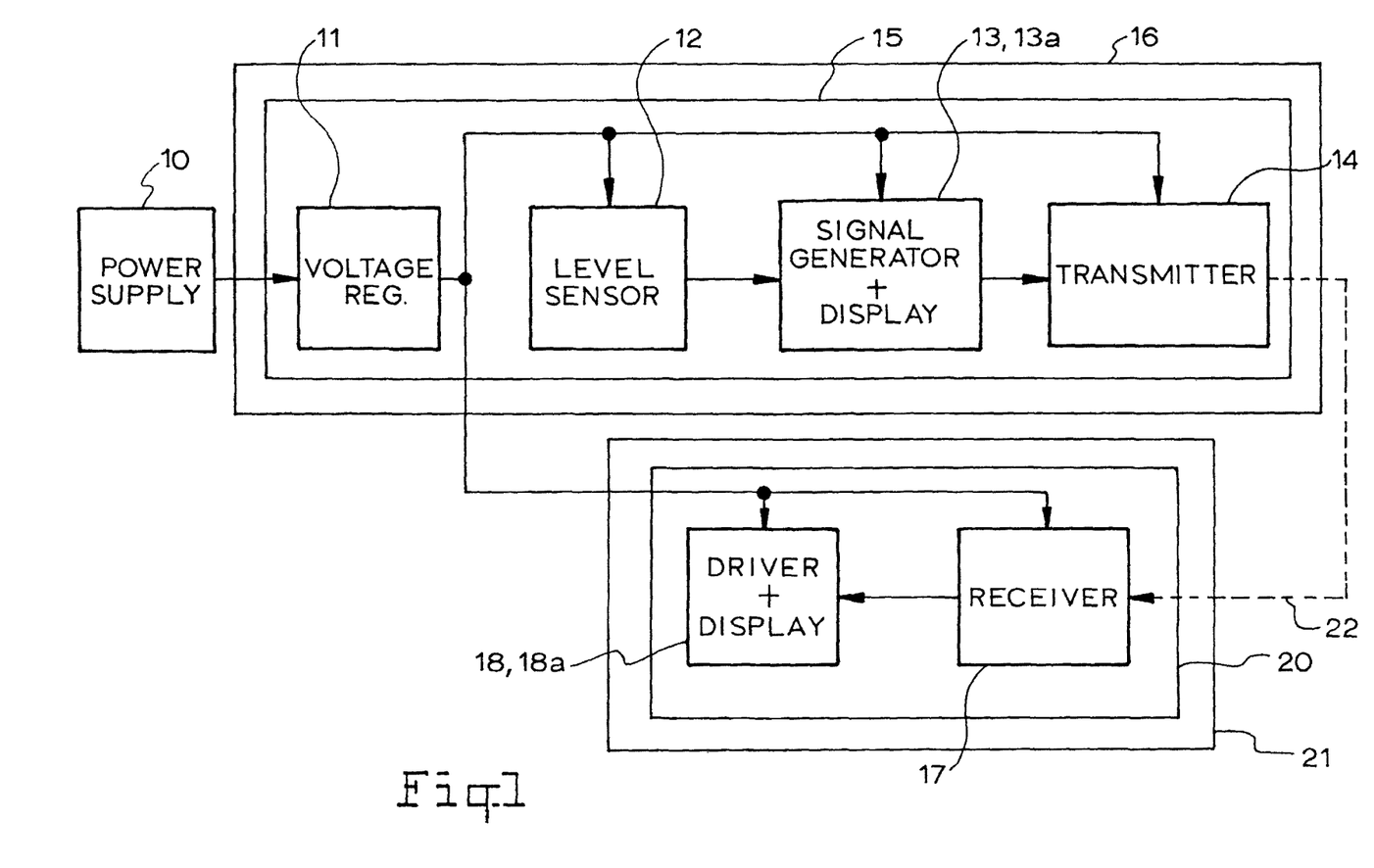
FIG. 1 is a schematic representation of the level indicator device.

As illustrated in a schematic sense in FIG. 1, an embodiment of the level indicator device comprises a DC electrical supply (typically a 12 volt power supply) 10 that normally will be sourced from and be connectable by a switch 10a to a battery in a towing vehicle. The electrical supply is connected by way of a voltage regulator 11 to an electrically energised level sensor 12, a signal generator 13 and associated display 13a, and a signal transmitter 14, all of which are, in use, mounted (as a single module within a casing 15) in an accessible location to the caravan 16. An output signal from the transmitter 14 is detectable by a remote receiver 17 and an output signal (containing data generated within the signal generator 13) is fed from the receiver to a driver 18 that has an associated display 18a. The receiver and connected circuitry, including the display 18a and an audible signalling device 19 (see FIG. 3), are located as a single module within a casing 20 which may be hand-held or, more typically, be mounted within a towing vehicle 21 for the caravan. Signal transmission between the transmitter 14 and the receiver 17 may be effected by way of a wired connection or, desirably, by way of a radiofrequency (wireless) transmission, both of which are indicated schematically by transmission link 22.

Figure 3:
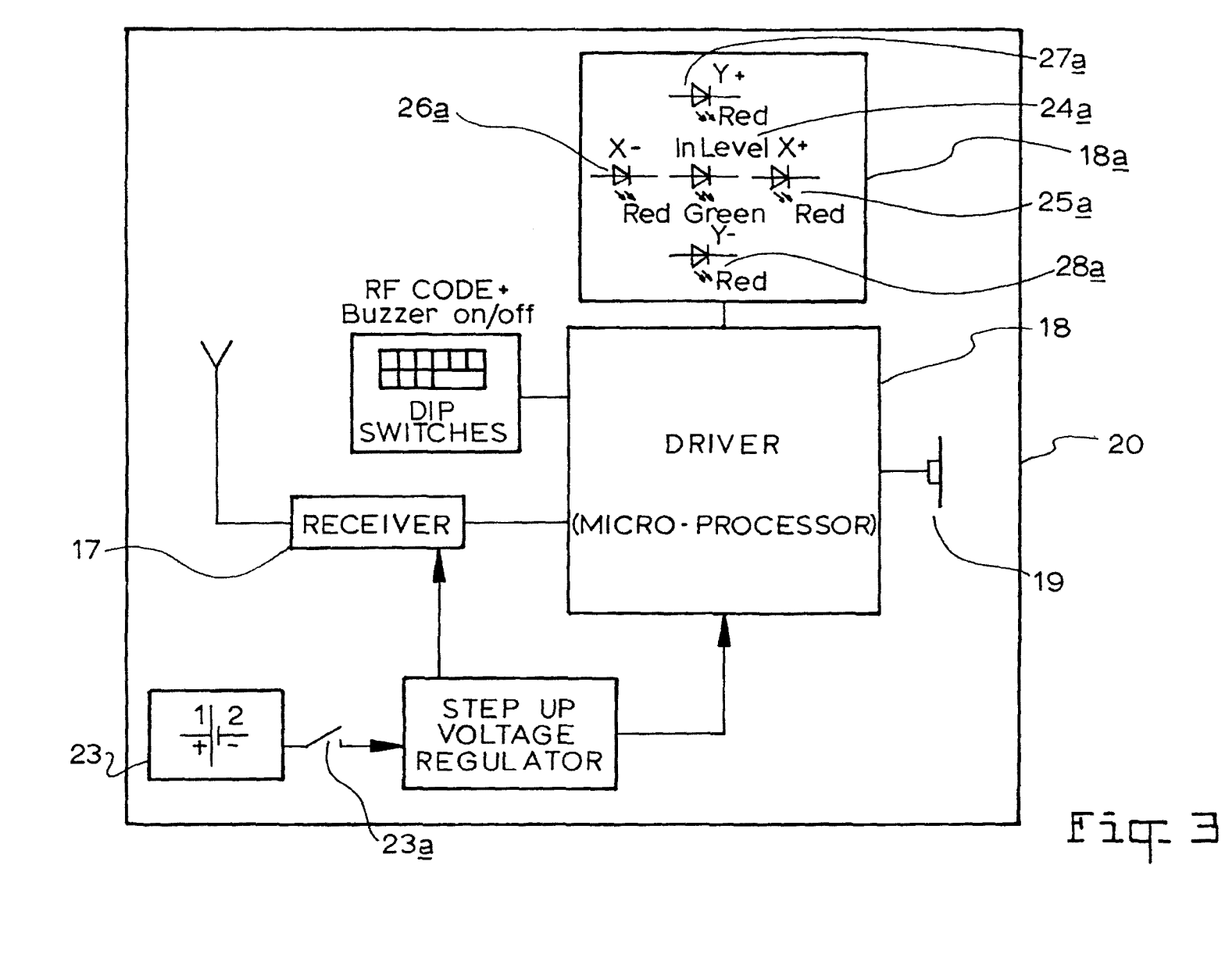
FIG. 3 is a block-diagrammatic representation of a module of the device that includes the receiver and driver-display as shown in FIG. 1.

The receiver components within the module casing 20 may, depending upon the portability required of the module, be energised from the electrical supply 10, as shown in FIG. 1, or from a separate battery 23, by way of a switch 23a, as shown in FIG. 3, within the module casing 20.

The level sensor 12 comprises a MEMS accelerometer tilt sensor that functions by measuring G-force in three orthogonal axes and, in use, provides an output signal that is representative/indicative of the prevailing level of the level sensor and, thus, the prevailing disposition/level of the caravan to which the level sensor is mounted. The level sensor in one possible form may comprise a micro-controlled electro-mechanical (MEMS) based tilt sensor, for example a MEMS accelerometer that measures G-force in plural axes. A proprietary level sensor may be employed for this purpose, one such sensor being accessible from ST Microelectronics under model number LIS344ALH.

Figure 6:
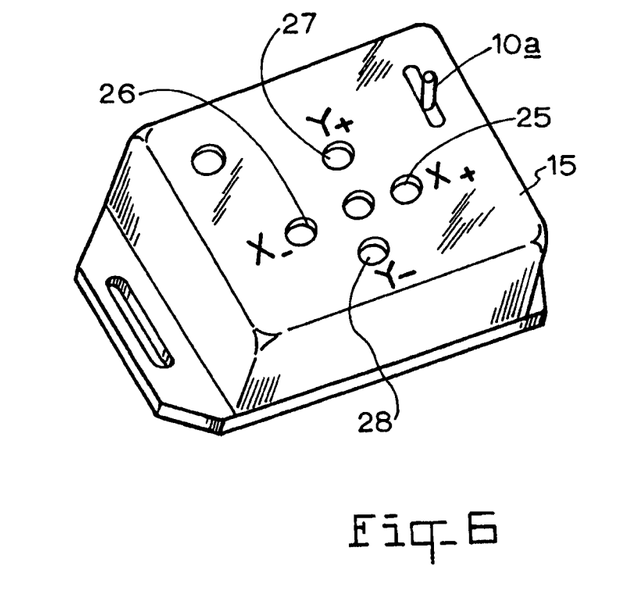
FIG. 6 is a physical representation of the module as shown in FIG. 2 as encased for mounting to a caravan.
Figure 7:
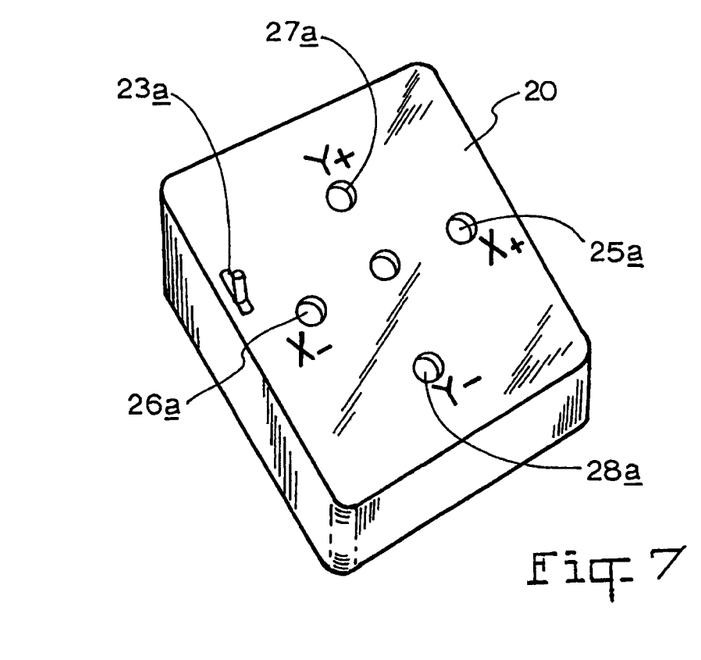
FIG. 7 is a physical representation of the module as shown in FIG. 3 as encased for location within a towing vehicle for the caravan.

The level sensor 12, as illustrated in FIG. 6, may be mounted to the caravan in either a horizontal or vertical orientation and provision is made in the signal generator/micro-processor 13 (as indicated in the flow chart of FIG. 4) to provide for the alternative orientation.

Figure 2:
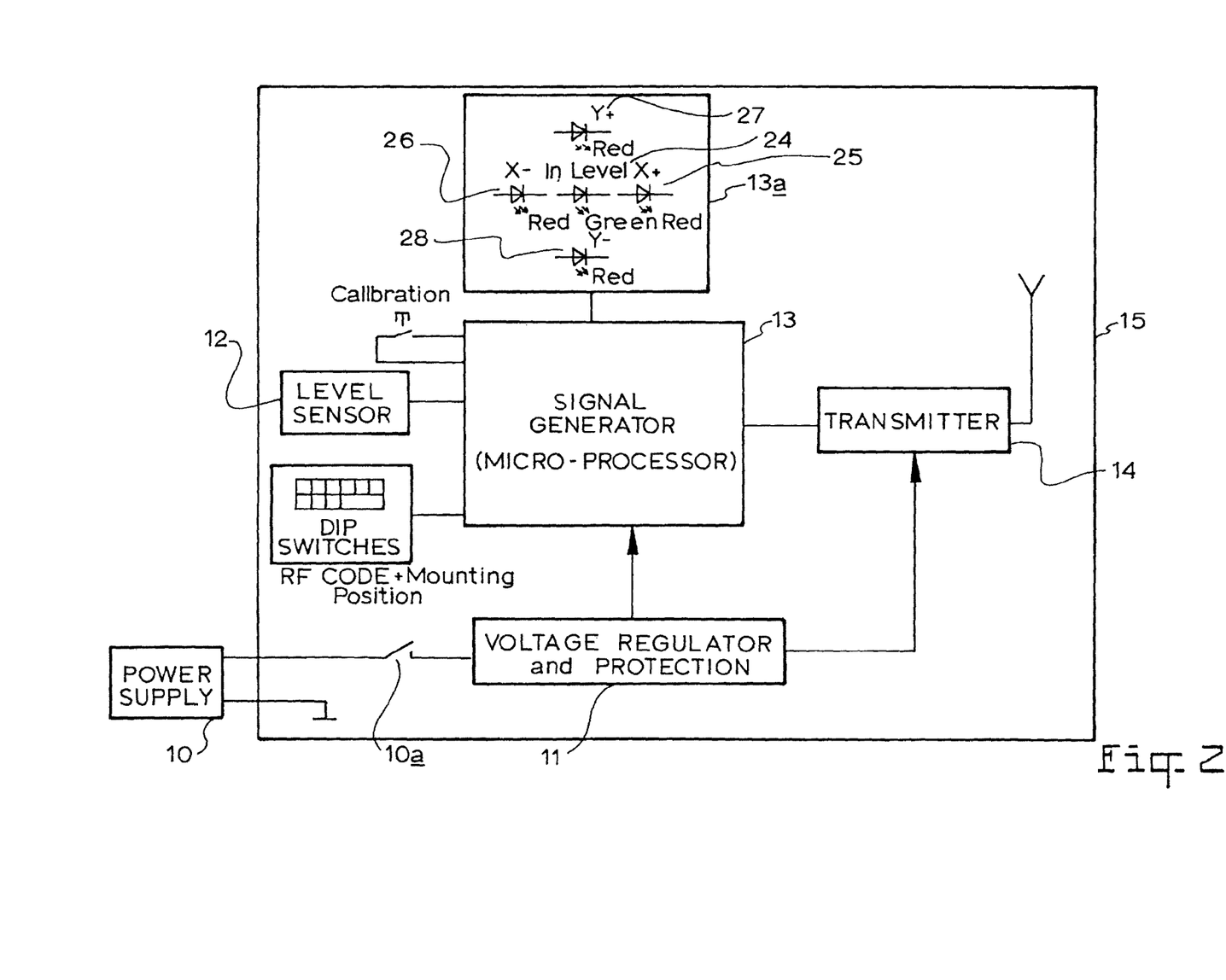
FIG. 2 is a block-diagrammatic representation of a module of the device that includes the level sensor, signal generator-display and transmitter as shown in FIG. 1.

As shown in FIG. 1 and, in more detail, in FIG. 2 the output signal from the level sensor 12 is applied as an input to the signal generator 13. The signal generator, in the form of a micro-processor, is arranged to detect for the prevailing level of the level sensor 12, as represented by the input signal, and to generate one or two of five possible display signals that represent sensor levels of) (0°+/−0.4°), (0°+α), (0°−α), (0°+β) and (0°−β) respectively, where α>0.4° and β>0.4°. The respective display signals are applied to LED's 24, 25, 26, 27 and 28 that are located in circuit with the micro-processor and, thus:

illumination of LED 24 and extinguishment of LED's 25 to 28 will indicate a substantially horizontal disposition of the level sensor 12 (and hence the caravan) in both the east-west and north-south directions, illumination of LED 25 will indicate a positive angle inclination of the level sensor 12 in the east-west direction, illumination of LED 26 will indicate a negative angle inclination of the level sensor 12 in the east-west direction, illumination of LED 27 will indicate a positive angle inclination of the level sensor 12 in the north-south direction, and illumination of LED 28 will indicate a negative angle inclination of the level sensor 12 in the north-south direction.

Calibration of the signal generator/micro-processor 13 for "true horizontal" may be effected in both the east-west and north-south directions at the time of mounting the module 15 to the caravan. This may be achieved by manoeuvring the caravan to a level disposition as measured by a spirit level in the manner described previously in the context of the prior art approach to levelling, and by calibrating the micro-processor when the level disposition has been achieved.

An output signal, incorporating the display signals, from the signal generator/micro-processor 13 is employed to modulate a radiofrequency carrier that is generated in the transmitter 14, and the resultant signal is radiated from the transmitter for detection by the receiver 17.

Figure 4:
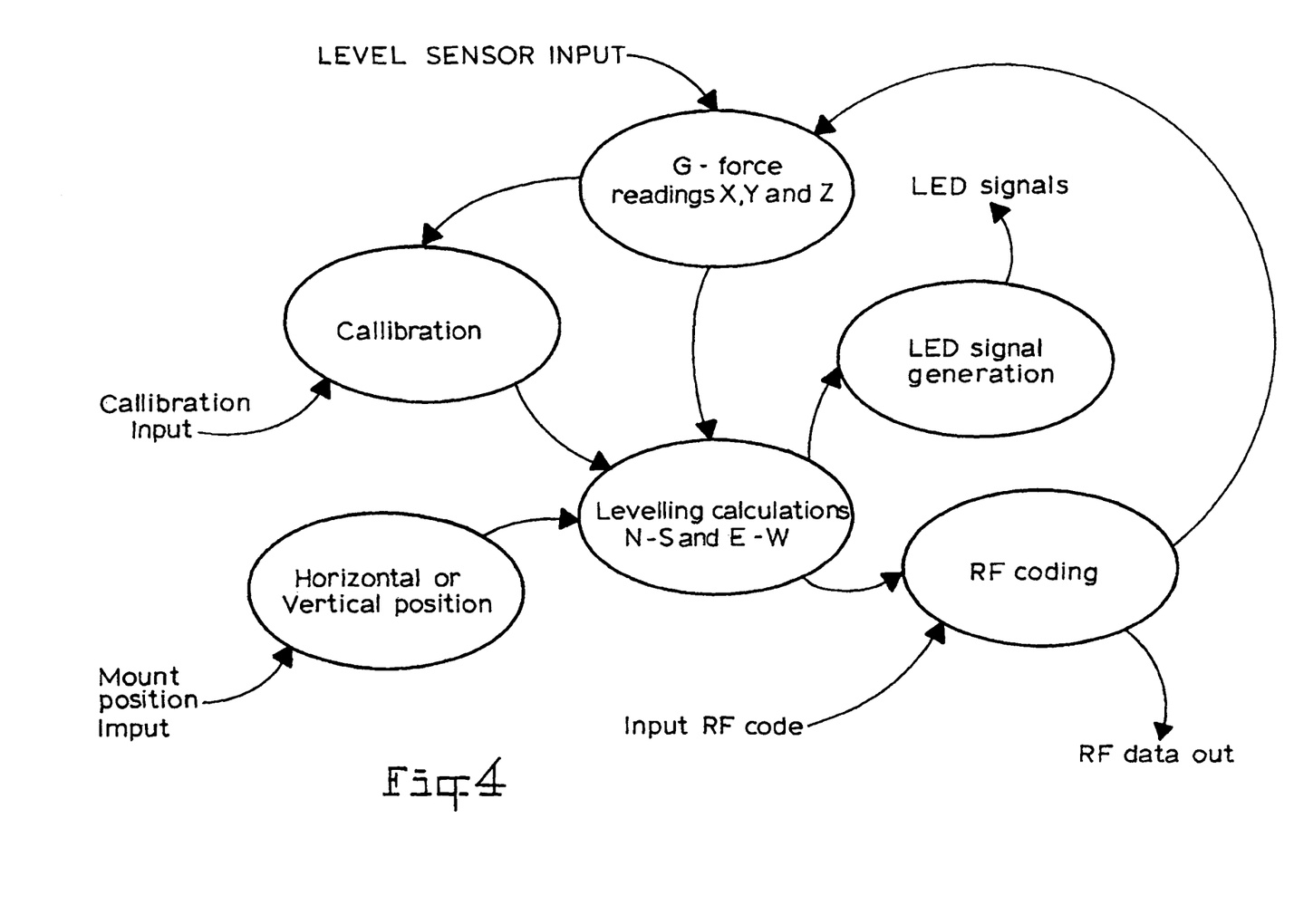
FIG. 4 shows a flow chart applicable to logic circuitry that is embodied in a micro-processor that constitutes the signal generator and display shown in FIGS. 1 and 2.

FIG. 4 shows a flow chart of software routines that form the basis of logic circuitry (not shown) that is embodied in the micro-processor that constitutes the signal generator 13. Given the information inherent in FIG. 4, the logic circuitry as such may be built substantially from standard components and, as in the case of circuitry that is specific to, for example, the transmitter and receiver components of the level indicator device, the actual circuit realisation may readily be derived by persons skilled in the relevant art.

The modulated radiofrequency signal from the transmitter 14 is detected and fed from the receiver 17 to the following driver (in the form of a micro-processor) 18 where display signals are generated to reflect those prevailing from time-to-time in the signal generator/micro-processor 13. The display signals as generated in the driver 18 are applied to relevant ones of LED's 24a to 28a.

Figure 5:
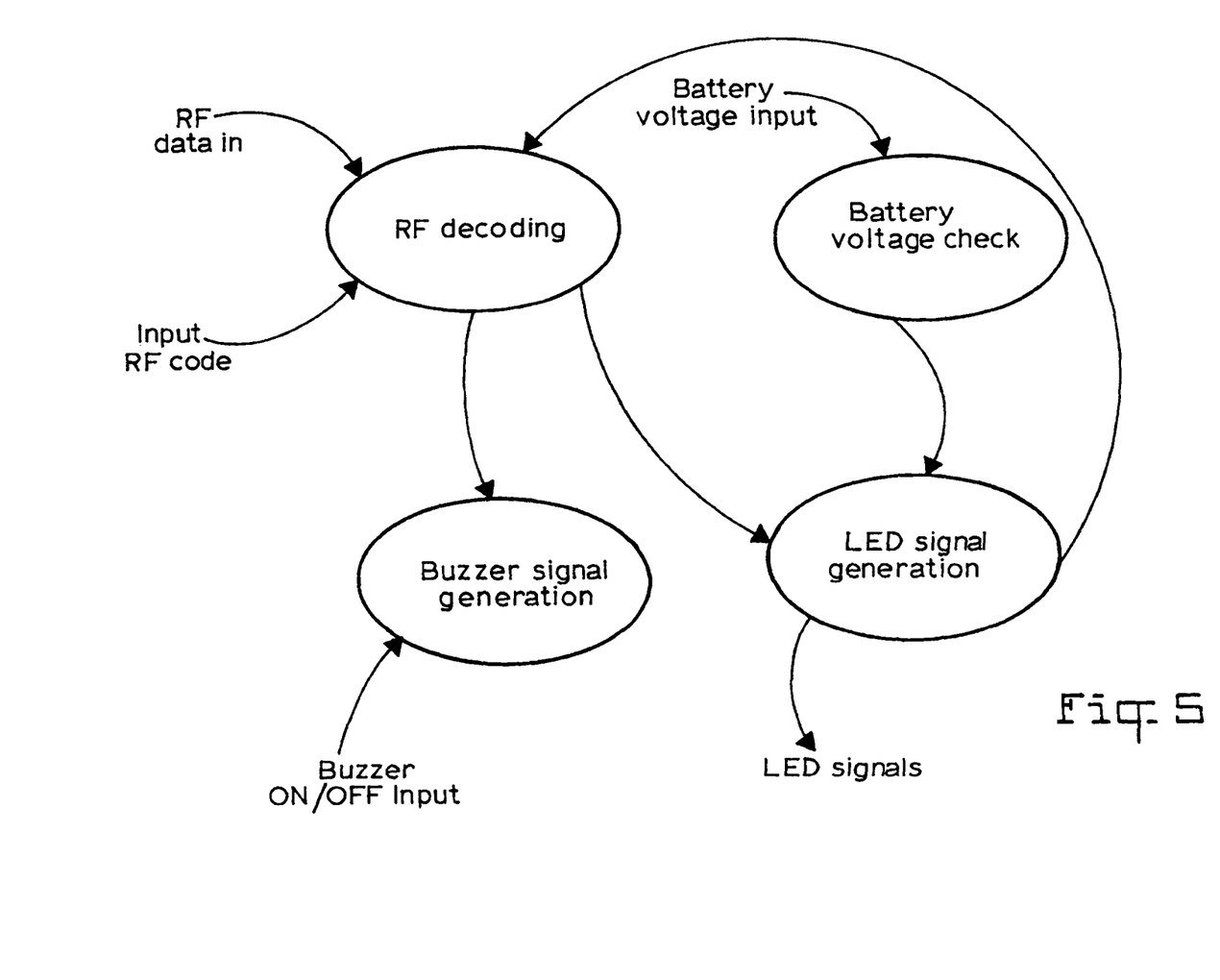
FIG. 5 shows a flow chart applicable to logic circuitry that is embodied in a micro-processor that constitutes the driver and display shown in FIGS. 1 and 3.

FIG. 5 shows a flow chart of software routines that form the basis of logic circuitry (not shown) that is embodied in the micro-processor that constitutes the signal driver 18. Here again the logic circuitry as such may be built substantially from standard components and the actual circuit realisation may readily be derived by persons skilled in the relevant art.

Figure 8:
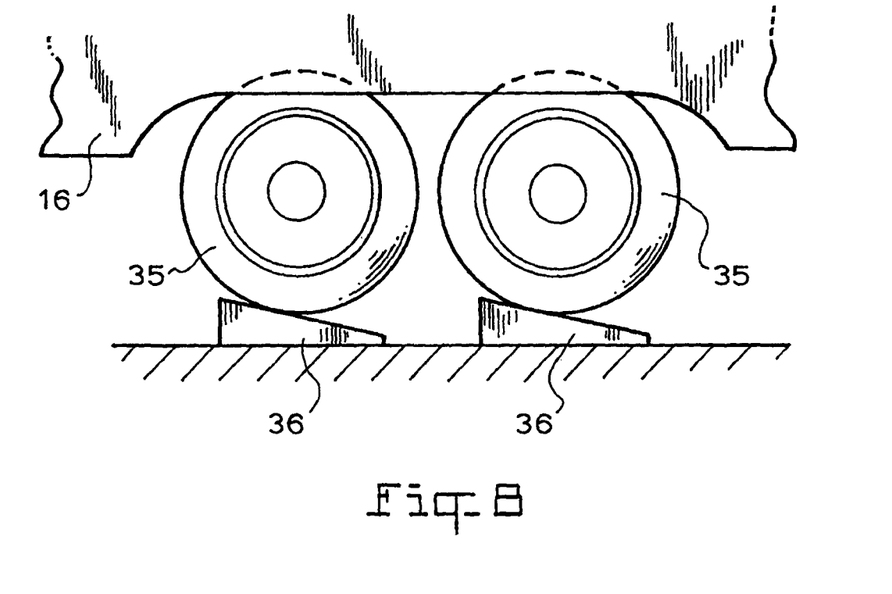
FIG. 8 shows two wheels of a twin axle caravan when being driven up wheel level-adjusting ramps.
Figure 9:
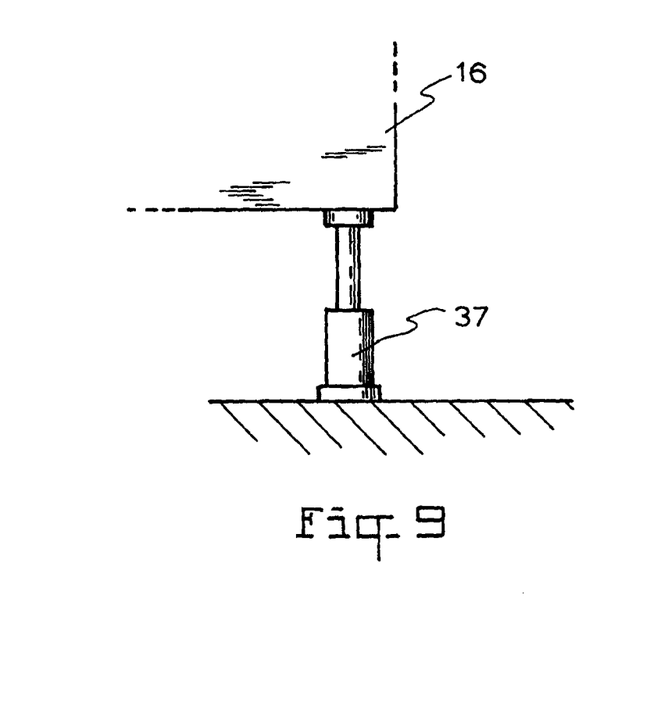
FIG. 9 is a diagrammatic representation of one of a pair of caravan-mounted level-adjusting hydraulic jacks for use as an alternative to the ramps shown in FIG. 8.

In use of the level indication device as above described, when the sensor module 15 is mounted to the caravan 16, the caravan may be manoeuvred into a substantially horizontal disposition in the east-west direction by driving the caravan wheel(s) 35 at a low-level side of the caravan 16 (as observed visually and/or as indicated by illumination of the LED's 25,25a or 26,26a) up ramp(s) 36 until those LED's extinguish. Alternatively, the low-level side of the caravan 16 might be elevated by employment of manually, hydraulically or pneumatically actuated jacks 37 that may be positioned at or fixed to suitable lifting points of the caravan.

Manoeuvring the caravan 16 into a substantially horizontal disposition in the north-south direction may be effected by employment of the jacks 37 or, alternatively by use of the jockey wheel (not shown) that conventionally is provided on the draw bar of all caravans. In this case, achievement of the horizontal disposition will be indicated by extinguishment of the 27,27a or 28,28a, and illumination of the LED's 24,24a if the caravan has previously been levelled in the east-west direction.

Similar approaches may be taken when manoeuvring road vehicles such as mobile cranes, product-transport trucks, trailers and motor homes. In this regard, the sensor module 15 can be mounted to a vehicle manoeuvred, as closely as possible into a length-to-length (or side-to-side) substantially horizontal disposition (e.g. as observed visually). This may be refined by the indication from the illumination of the LED's 25,25a or 26,26a (i.e. until those LED's extinguish).

Any low-level side of the vehicle can be elevated by employment of manually, hydraulically or pneumatically actuated jacks that may be positioned at or prior-fixed to suitable lifting points of the vehicle. Again, achievement of an overall horizontal disposition can be indicated by extinguishment of the 27,27a or 28,28a, and illumination of the LED's 24,24a, where the vehicle has previously been levelled (length-to-length or side-to-side).

Variations and modifications falling within the scope of the appended claims may be made in respect of the level indicator device and vehicle level adjusting system as above described and illustrated in the accompanying drawings. It should thus be understood that the device and system are not limited to the description and illustration of the specific embodiments herein.

In both the claims and the preceding description, except where the context requires otherwise due to express language or necessary implication, the word "comprise" or variations such as "comprises" or "comprising" is used in an inclusive sense (i.e. to specify the presence of the stated features but not to preclude the presence or addition of further features in various embodiments of the device and system).

The invention claimed is:

1. A level indicator device for use in conjunction with a road vehicle and which comprises:
    an electrically energised level sensor comprising an accelerometer that measures G-force in at least three axes and that is arranged to provide an output signal that is representative of a prevailing level of the sensor,
    a signal generator associated with the sensor and arranged in use to receive the sensor output and, in response thereto, to generate signals that are representative of prevailing inclination of the sensor in orthogonal directions and that are representative of a substantially horizontal level when that level is sensed to prevail by the sensor, the signal generator able to be calibrated in order to generate said signals when the device is mounted in either a generally horizontal or a generally vertical orientation,
    a radiofrequency signal transmitter located in circuit with the signal generator and arranged to transmit a radiofrequency signal that is modulated by the signal generated by the signal generator, and
    a remote receiver that is arranged to receive and demodulate the radiofrequency signal and to display indications of the prevailing inclination or horizontal level of the sensor.

2. A level indicator device as claimed in claim 1 wherein the level sensor and the associated signal generator are, in use, mounted to the road vehicle.

3. A level indicator device as claimed in claim 1 wherein the remote receiver comprises a hand-held device.

4. A level indicator device as claimed in claim 1 wherein the remote receiver comprises a fixed position device which, in use, is located within a towing vehicle for the road vehicle or in a drive cabin of a unitary said road vehicle.

5. A level indicator device as claimed in claim 1, wherein the signals generated by the signal generator are fed to the radiofrequency transmitter and wherein the transmitter is arranged to frequency modulate a carrier signal that, in use, is radiated by the transmitter.

6. A level indicator device as claimed in any claim 1, wherein the sensor comprises a micro-controlled electro-mechanical (MEMS) accelerometer.

7. A level indicator device as claimed in claim 1 wherein the signal generator is arranged to generate a signal that is representative of a substantially horizontal level when, in use, the output signal from the level sensor is representative of a level within the range of $(0°+/-5°)$.

8. A level indicator device as claimed in claim 1 wherein the signal generator is arranged to generate a signal that is representative of a substantially horizontal level when, in use, the output signal from the level sensor is representative of a level within the range of $(0°+/-<0.5°)$.

9. A level indicator device as claimed in claim 1 wherein the remote receiver incorporates a display device comprising a network of five light emitting diodes (LED's), which are arranged to be biased into conduction to display the indications of the inclination or horizontal level of the sensor.

10. A level indicator device as claimed in claim 9 wherein the remote receiver comprises a radiofrequency receiver stage that is arranged to detect for a modulated radiofrequency transmission that is, in use, radiated by the transmitter, the receiver stage being located in circuit with a driver and the associated display device.

11. A level indicator as claimed in claim 10 wherein the signal generator incorporates a display device comprising a network of five LED's that are arranged to display indications of the prevailing inclination or horizontal level of the sensor corresponding to those displayed by the remote receiver.

12. A vehicle level adjusting system for a road vehicle and which comprises a level indicator device as claimed in claim 1 and a plurality of level adjusting devices that are arranged to effect levelling of the vehicle in an east-west direction, the level adjusting devices comprising ramps up which the vehicle may be maneuvered to adjust the vehicle level to a substantially horizontal disposition.

13. A vehicle level adjusting system for a road vehicle and which comprises a level indicator device as claimed in claim 1 and a plurality of level adjusting devices that are arranged to effect levelling of the vehicle, the level adjusting devices comprising jacking actuators which are positioned and actuatable to effect levelling of the vehicle to a substantially horizontal disposition.

* * * * *